United States Patent
Zhang et al.

(10) Patent No.: US 11,501,121 B2
(45) Date of Patent: Nov. 15, 2022

(54) BINOMIAL SUBSAMPLE DATA AUGMENTED CNN FOR IMAGE CLASSIFICATION

(71) Applicant: Siemens Medical Solutions USA, Inc., Malvern, PA (US)

(72) Inventors: Shuchen Zhang, Champaign, IL (US); Xinhong Ding, Buffalo Grove, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 138 days.

(21) Appl. No.: 16/735,844

(22) Filed: Jan. 7, 2020

(65) Prior Publication Data

US 2021/0209405 A1 Jul. 8, 2021

(51) Int. Cl.
G06K 9/00 (2022.01)
G06K 9/62 (2022.01)
G06T 7/00 (2017.01)
G06T 3/00 (2006.01)

(52) U.S. Cl.
CPC ............ G06K 9/628 (2013.01); G06T 3/0006 (2013.01); G06T 7/0012 (2013.01); G06T 2207/10108 (2013.01); G06T 2207/20081 (2013.01)

(58) Field of Classification Search
CPC ..... G06K 9/628; G06T 7/0012; G06T 3/0006; G06T 2207/20081; G06T 2207/10108
See application file for complete search history.

(56) References Cited

U.S. PATENT DOCUMENTS

| 6,559,450 | B1 | 5/2003 | Berlad et al. |
| 2014/0270443 | A1* | 9/2014 | Vija .................. A61B 6/037 382/131 |
| 2017/0309061 | A1* | 10/2017 | Wang ................. G06T 19/00 |
| 2019/0223728 | A1* | 7/2019 | Heidari ............... A61B 5/0088 |
| 2019/0318476 | A1* | 10/2019 | Isgum ................. A61B 6/5217 |
| 2020/0027237 | A1* | 1/2020 | Baumgartner ....... G06T 11/001 |
| 2020/0113529 | A1* | 4/2020 | Obrzut ................ A61B 6/4258 |
| 2020/0234119 | A1* | 7/2020 | Shi ..................... G06N 3/063 |
| 2021/0128818 | A1* | 5/2021 | Vaz .................... A61B 6/545 |
| 2021/0151170 | A1* | 5/2021 | Shi .................... G06N 20/10 |

* cited by examiner

*Primary Examiner* — Claire X Wang
*Assistant Examiner* — Han Hoang (57) ABSTRACT

A method for automatically classifying emission tomographic images includes receiving original images and a plurality of class labels designating each original image as belonging to one of a plurality of possible classifications and utilizing a data generator to create generated images based on the original images. The data generator shuffles the original images. The number of generated images is greater than the number of original images. One or more geometric transformations are performed on the generated images. A binomial sub-sampling operation is applied to the transformed images to yield a plurality of sub-sampled images for each original image. A multi-layer convolutional neural network (CNN) is trained using the sub-sampled images and the class labels to classify input images as corresponding to one of the possible classifications. A plurality of weights corresponding to the trained CNN are identified and those weights are used to create a deployable version of the CNN.

10 Claims, 10 Drawing Sheets

| Layer (type) | Output Shape | Param # |
| --- | --- | --- |
| conv2d_1 (Conv2D) | (None, 256, 256, 32) | 832 |
| activation_1 (Activation) | (None, 256, 256, 32) | 0 |
| conv2d_2 (Conv2D) | (None, 252, 252, 32) | 25632 |
| activation_2 (Activation) | (None, 252, 252, 32) | 0 |
| max_pooling2d_1 (MaxPooling2 | (None, 126, 126, 32) | 0 |
| dropout_1 (Dropout) | (None, 126, 126, 32) | 0 |
| conv2d_3 (Conv2D) | (None, 126, 126, 64) | 51264 |
| activation_3 (Activation) | (None, 126, 126, 64) | 0 |
| conv2d_4 (Conv2D) | (None, 122, 122, 64) | 102464 |
| activation_4 (Activation) | (None, 122, 122, 64) | 0 |
| max_pooling2d_2 (MaxPooling2 | (None, 61, 61, 64) | 0 |
| dropout_2 (Dropout) | (None, 61, 61, 64) | 0 |
| flatten_1 (Flatten) | (None, 238144) | 0 |
| dense_1 (Dense) | (None, 512) | 121930240 |
| activation_5 (Activation) | (None, 512) | 0 |
| dropout_3 (Dropout) | (None, 512) | 0 |
| dense_2 (Dense) | (None, 2) | 1026 |
| activation_6 (Activation) | (None, 2) | 0 |

Total params: 122,111,458
Trainable params: 122,111,458
Non-trainable params: 0

*Fig. 5*

| Training/Validation/Testing data | |
|---|---|
| Number of Training Flood Images | 1680 |
| Number of Validation Flood Images | 480 |
| Number of Testing Flood Images | 240 |

| Training parameters and accuracies | |
|---|---|
| Training batch size | 16 |
| Validation batch size | 16 |
| Number of epochs | 20 |
| Training accuracy rate | 0.99 |
| Validation accuracy rate | 0.83 |

BINOMIAL SUBSAMPLE DATA AUGMENTED CNN FOR IMAGE CLASSIFICATION

TECHNICAL FIELD

The present disclosure relates generally to a binomial subsample data augmented convolutional neural network (CNN) for image classification. The various systems, methods, and apparatuses described herein may be used, for example, for single-photon emission computed tomography (SPECT) intrinsic flood classification to analyze SPECT gamma detector health.

BACKGROUND

A conventional technique for calibrating a single-photon emission computed tomography (SPECT) scanner is to irradiate the detector array of the scanner with an annihilation flood source to generate a two-dimensional distribution of the detected events, referred to as a "flood image." Using techniques generally known in the art, a calibration map can be generated from the flood image to map the position of radiation events to the actual position of a corresponding scintillator crystal. This calibration map can then be used to identify any geometric distortions in acquired image data.

For assessing the health of a scanner's gamma detector, an "intrinsic" flood image is used. An intrinsic flood image is a flood image acquired with the collimator of the scanner removed, and without any energy, spatial, or sensitivity corrections. Once acquired, the intrinsic flood image is analyzed to identify issues such as edge packing artefacts and the presence of tube patterns in acquired images. These issues can then be addressed, either by applying corrections to image data or, in severe cases, by replacing hardware components of the SPECT scanner.

In conventional systems, intrinsic flood images are analyzed manually by a human observer with visual evaluation, aided by the basic uniformity measures defined by National Electrical Manufacturers Association (NEMA). The analyses are highly dependent on the engineers who usually have various levels of experience with the evaluation of the floods and is hard to reproduce. A reliable and repeatable method is needed to analyze the overall quality of the flood images, in order to facilitate the evaluation process and improve the accuracy of the analysis.

SUMMARY

Embodiments of the present invention address and overcome one or more of the above shortcomings and drawbacks, by providing methods, systems, and apparatuses related to a binomial subsample data augmented convolutional neural networks (CNN) for SPECT image classification.

According to some embodiments, a computer-implemented method for automatically classifying emission tomographic images includes receiving a plurality of original images and a plurality of class labels designating each original image as belonging to one of a plurality of possible classifications and utilizing a data generator to create a plurality of generated images based on the original images. The data generator shuffles the original images. The number of generated images is greater than the number of original images. One or more geometric transformations are performed on the generated images to yield a plurality of transformed images. A binomial sub-sampling operation is applied to the transformed images to yield a plurality of sub-sampled images for each original image. A multi-layer convolutional neural network (CNN) is trained using the sub-sampled images and the class labels to classify input images as corresponding to one of the possible classifications. A plurality of weights corresponding to the trained CNN are identified and those weights are used to create a deployable version of the CNN.

According to other embodiments, a computer-implemented method for automatically classifying emission tomographic images includes receiving a plurality of original intrinsic flood images. In addition to the original intrinsic flood images, class labels are received that designate each original intrinsic flood image with a classification that describes any non-uniformities present in the original intrinsic flood image. A data generator is used to create a plurality of generated images based on the original images. The data generator shuffles the original images and the number of generated images is greater than the number of original images. Geometric transformations are performed on the generated flood images to yield a plurality of transformed images. A binomial sub-sampling operation is applied to the transformed images to yield a plurality of sub-sampled images for each original intrinsic flood image. A multi-layer CNN is trained using the sub-sampled images and the class labels to classify input intrinsic flood images as corresponding to one of the plurality of classifications. A plurality of weights corresponding to the trained CNN are identified and those weights are used to create a deployable version of the CNN.

According to other embodiments, this system for computer-implemented method for automatically classifying emission tomographic images comprises a memory unit and an image processing computer. The memory unit stores a plurality of original images and a plurality of class labels designating each original image as belonging to one of a plurality of possible classifications. The image processing computer is configured to randomly generate a plurality of subsets of the original images using a data generator. Geometric transformations are performed on the generated images, and a binomial sub-sampling operation is applied to the transformed images to yield a plurality of sub-sampled images for each original image. A multi-layer CNN is trained using the sub-sampled images and the class labels to classify input images as corresponding to one of the plurality of classifications. In some embodiments, the image processing computer is implemented using a parallel processing memory architecture, and the CNN executes in parallel across a plurality of processing units.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to using a deep convolutional neural network (CNN) to automatically classify SPECT images into two or more class labels. The techniques described herein employ a multi-layer CNN with a customized data generator specific to emission tomographic images. To improve classification accuracy, a dual data shuffling schema is applied to train this neural network. The first shuffle which utilized a bootstrap is done inside the data generator for generating a set of random samples; the second shuffling is inside the CNN training loop itself. The technology disclosed herein is described with reference to the classification of intrinsic flood images; however it should be understood the technology can be applied generally to any type of emission tomographic image classification.

Figure 1:
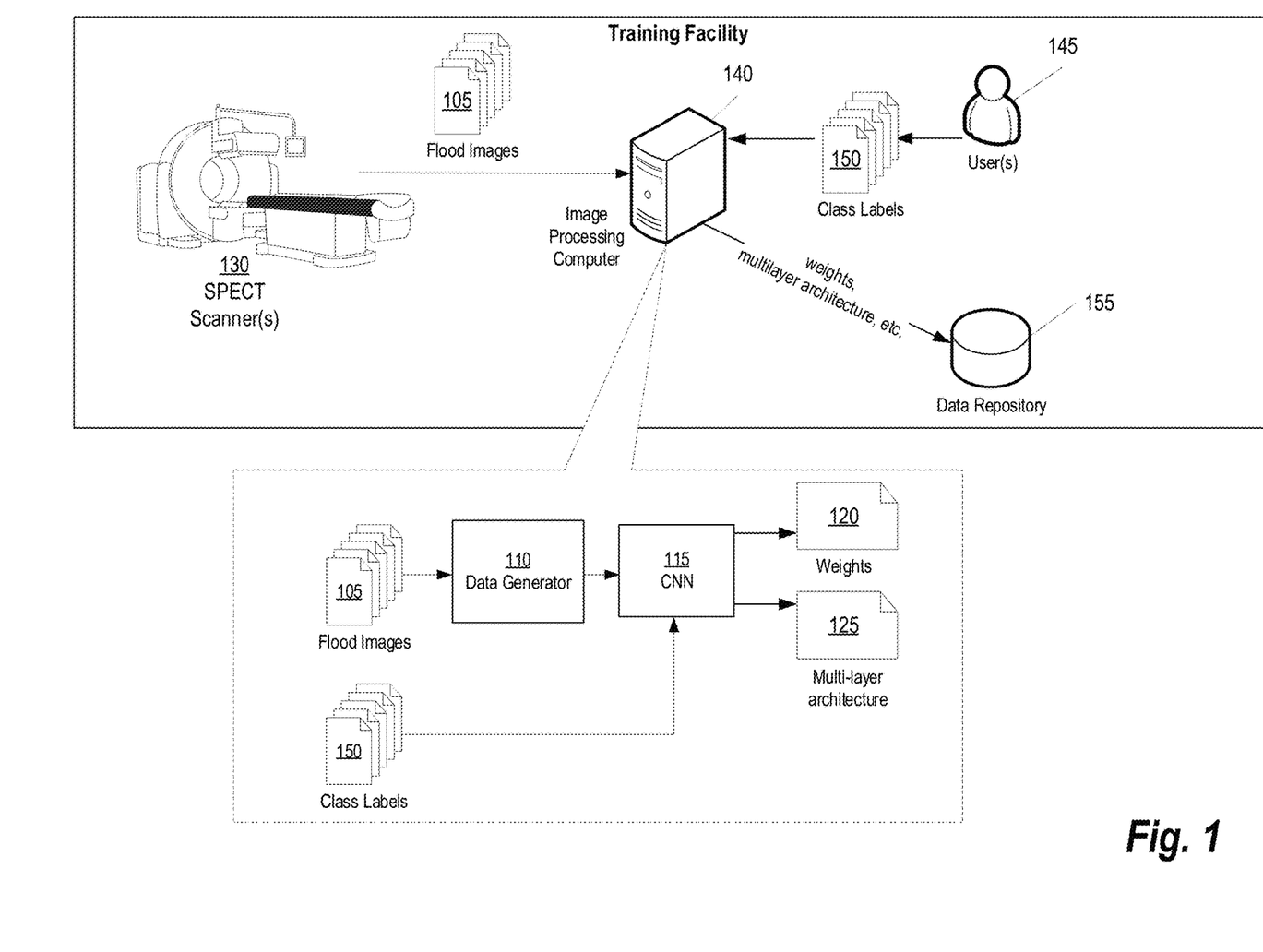
FIG. 1 illustrates a system for training a multi-layer CNN, according to some embodiments.
Figure 2:
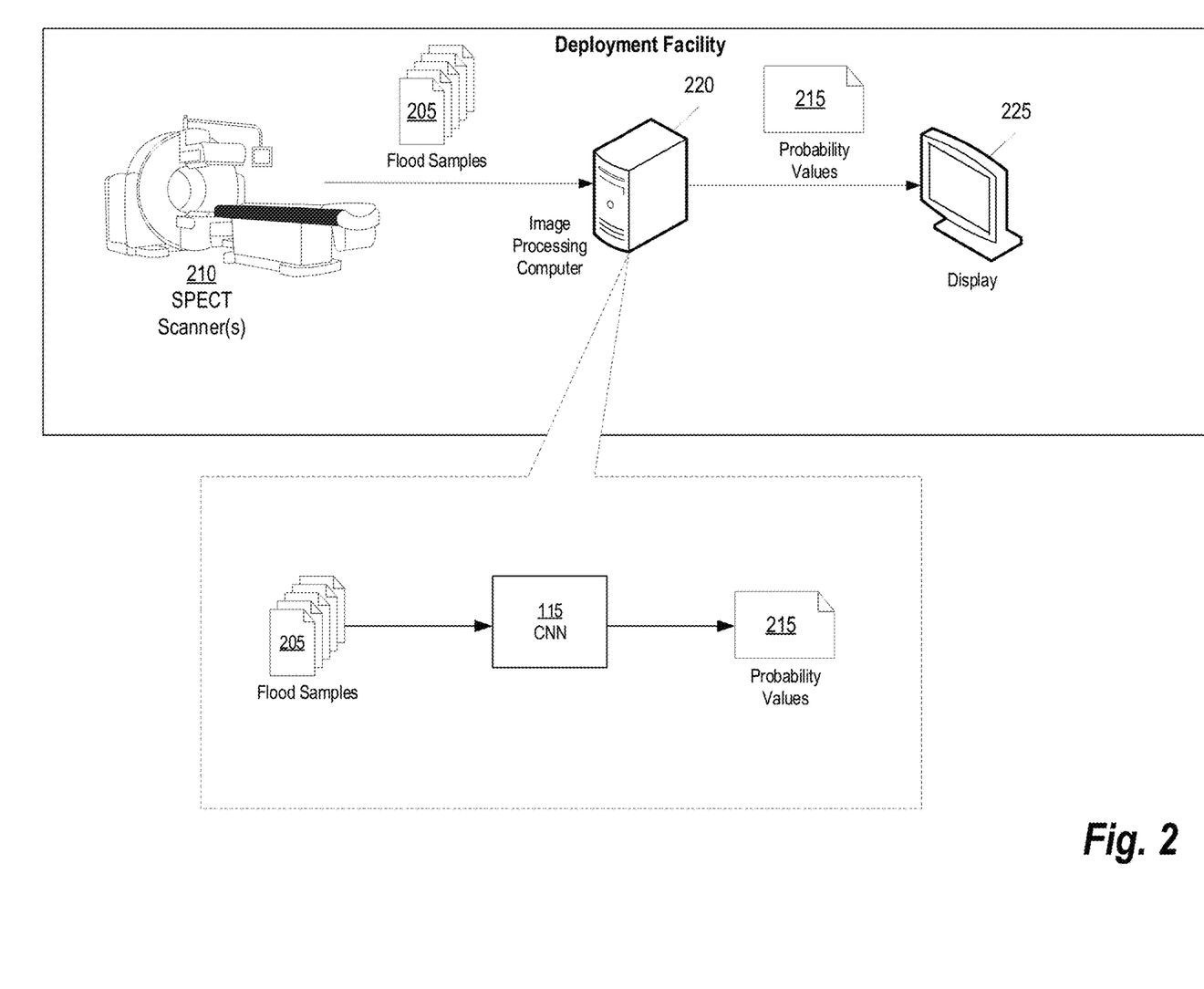
FIG. 2 illustrates a system for deploying a multi-layer CNN, according to some embodiments.

As illustrated by FIG. 1 and FIG. 2, the classification system described herein includes two operation phases: the training phase and the deploy phase. During the training, a set of labeled flood images are inputted into the system. The system first generates large quantities of data through a combination of bootstrap sampling, geometric transformations and the Binomial sub-sampling. The generated samples are then used to train a multi-layer CNN to generate various weights that define the model. During the deploy phase, the trained CNN is applied to an input flood image, and the output, in the case of two classes, is a pair of probabilities (p, 1−p) corresponding to the good and bad two classes.

FIG. 1 illustrates a system for training the multi-layer CNN, according to some embodiments. In this example one or more SPECT Scanners 130 provide Flood Images 105 to the Image Processing Computer 140. The Flood Images 105 are generated by each SPECT Scanner 130 irradiating its respective detector array with an annihilation flood source. Ideally, the SPECT Scanners 130 comprise a homogeneous grouping of scanner types with hardware components at various ages to provide a diverse set of Flood Images 105. Users 145 view the Flood Images 105 and provide Class Labels 150 that describe each image as "good flood" or "bad flood." In this context, a bad flood image may contain non-uniformities due to hydration, artefacts and tubeyness, etc. Hydration appears as dots of various size in the flood image. Artefacts could be in shape of blob, slash, dark edge, crack etc. Conversely, a good flood image does not include any non-uniformities.

In some embodiments, the Class Labels 150 are binary values (e.g., 1 corresponding to good flood and 0 corresponding to bad flood). In other embodiments, the Class Labels 150 may be selected from a range of values (e.g., 1-10). In still other embodiments, the Users 145 may provide non-numerical textual descriptions and the Image Processing Computer 140 uses natural language processing or some other form of machine learning to generate the Class Labels 150.

The Flood Images 105 are input into a Data Generator 110 executed by the Image Processing Computer 140. The Data Generator 110 creates multiple versions of each Flood Image 105 by modifying it in a manner that changes the presentation of the image without affecting its illustration of good or bad flood. For example, in some embodiments, the Data Generator 110 first utilizes the bootstrap to generate k subsets of the original flood image set 105, for each of the images in these k bootstrapped subsets, and it then performs one or more geometric transformations such as shifting, rotating, flipping, stretching, or shrinking the image in a horizontal, vertical, or diagonal direction. In addition to geometric transformations, the Data Generator 110 performs a data thinning operation tailored to SPECT data. For example, in some embodiments, based on the Poisson nature of SPECT images, binomial sub-sampling is used in conjunction with the geometric transformations. Binomial sub-sampling is a probabilistic count reduction technique that is capable of generating a large amount of image data with different counts yet preserving the Poisson distribution of the original data. By properly combining the geometric transformations with the Binomial sub-sampling with different sampling rates and realizations, one can, in principle, generate as many data samples as one wishes.

Figure 3A:
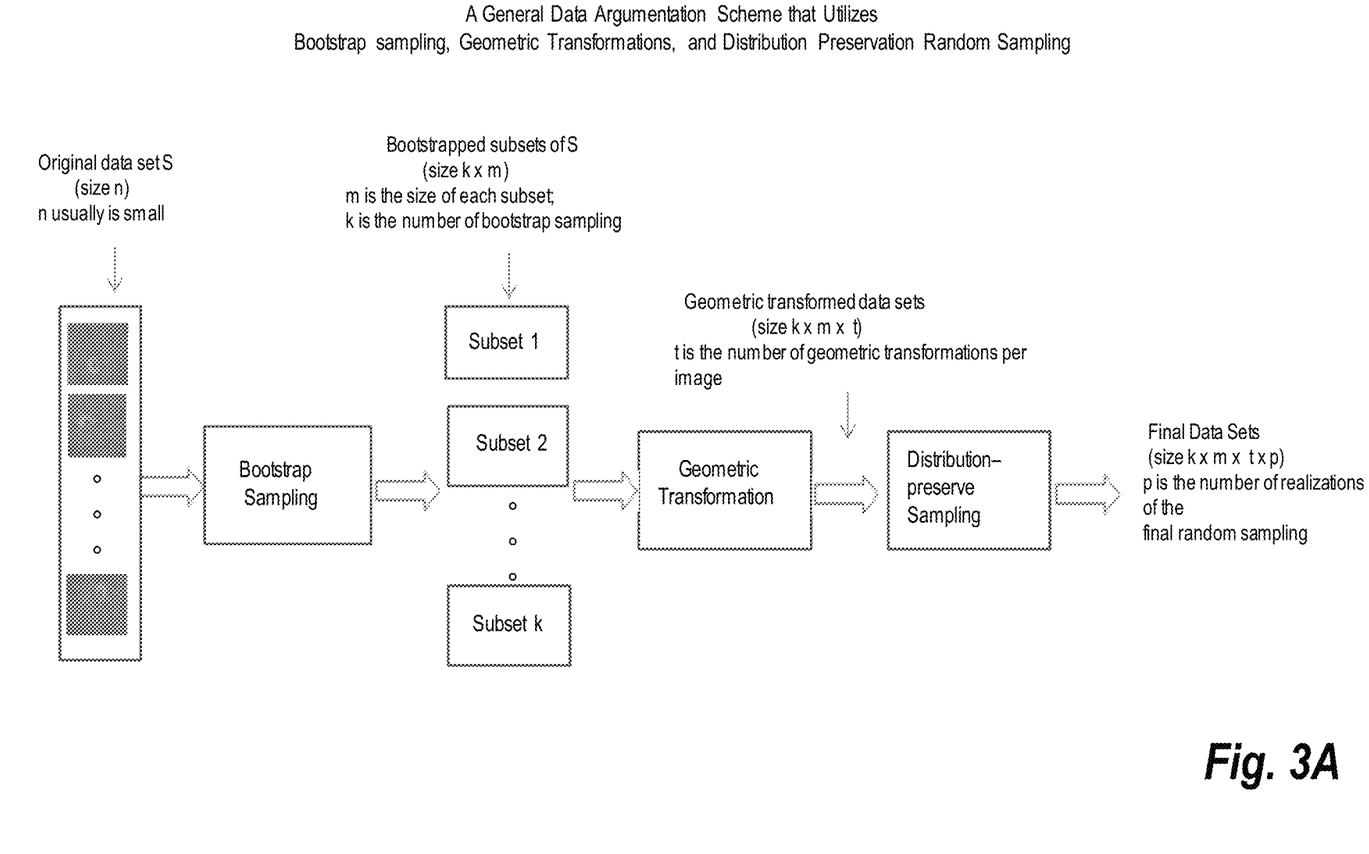
FIG. 3A illustrates an exemplary general data argumentation scheme that utilizes bootstrap sampling, geometric transformations, and distribution preservation random sampling.
Figure 3B:
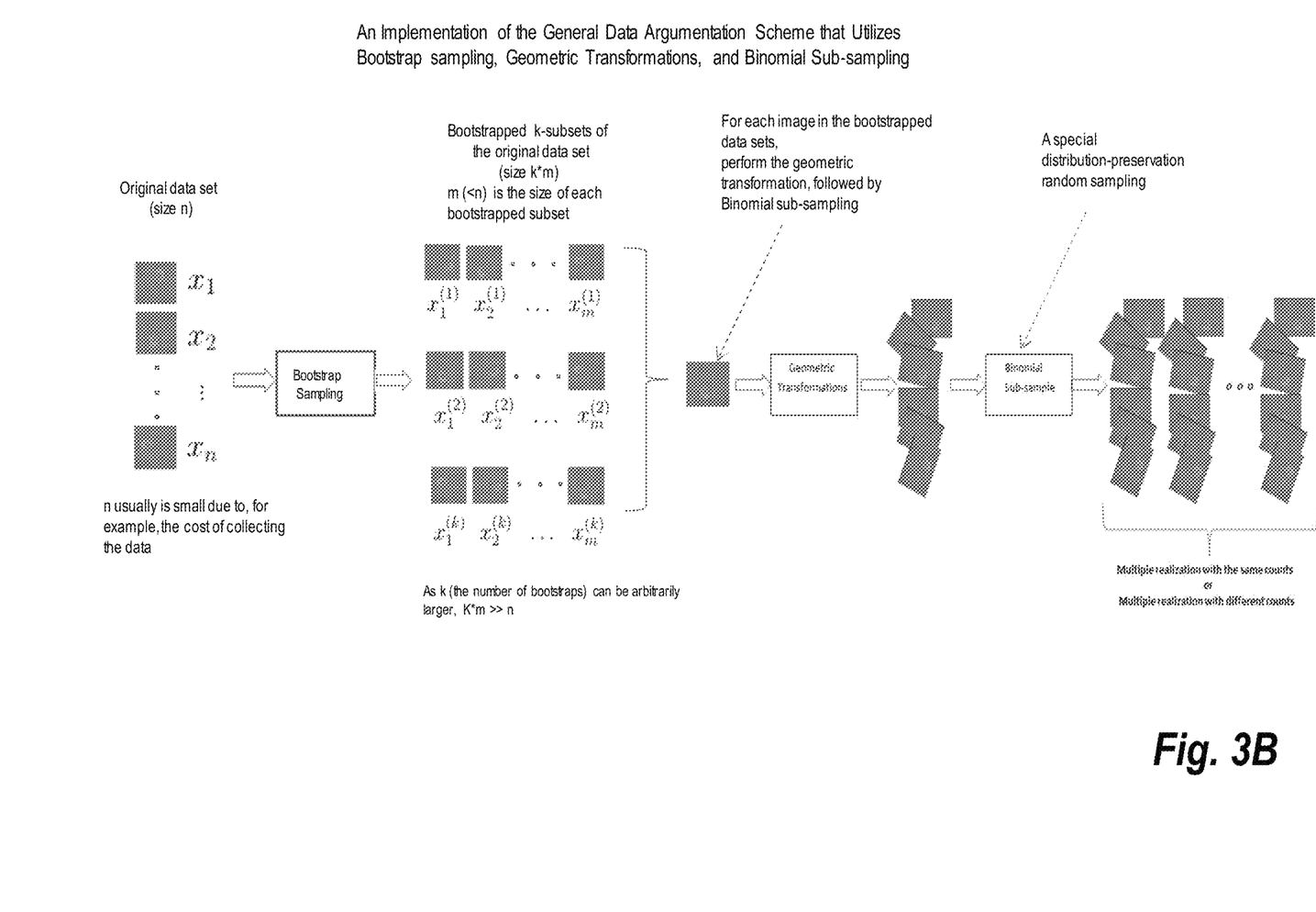
FIG. 3B shows another implementation of the general data argumentation scheme that utilizes bootstrap sampling, geometric transformations, and binomial sub-sampling.

FIG. 3A illustrates an exemplary general data argumentation scheme that may be employed by the Data Generator 110, according to some embodiments. This scheme utilizes bootstrap sampling, geometric transformations, and distribution preservation random sampling. FIG. 3B shows another implementation of the general data argumentation scheme that utilizes bootstrap sampling, geometric transformations, and binomial sub-sampling.

The Data Generator 110 illustrated in FIG. 1 maintains the relationship between the generated images and the original class label corresponding to the input image. That is, the original image input into the Data Generator 110 generates a plurality of output images. Each of those output images should have the same good or bad flood label as the original image. This may be enabled in various ways. For example, in some embodiments, the input image may have a unique file name referred to by the corresponding class label. Each transformed image output by the Data Generator 110 may append one or more characters to the original name. As a simple example, if the original file name is "original_filename," the generated files may be named, "original_filename_0001", "original_filename_0002", etc.

Figure 4:
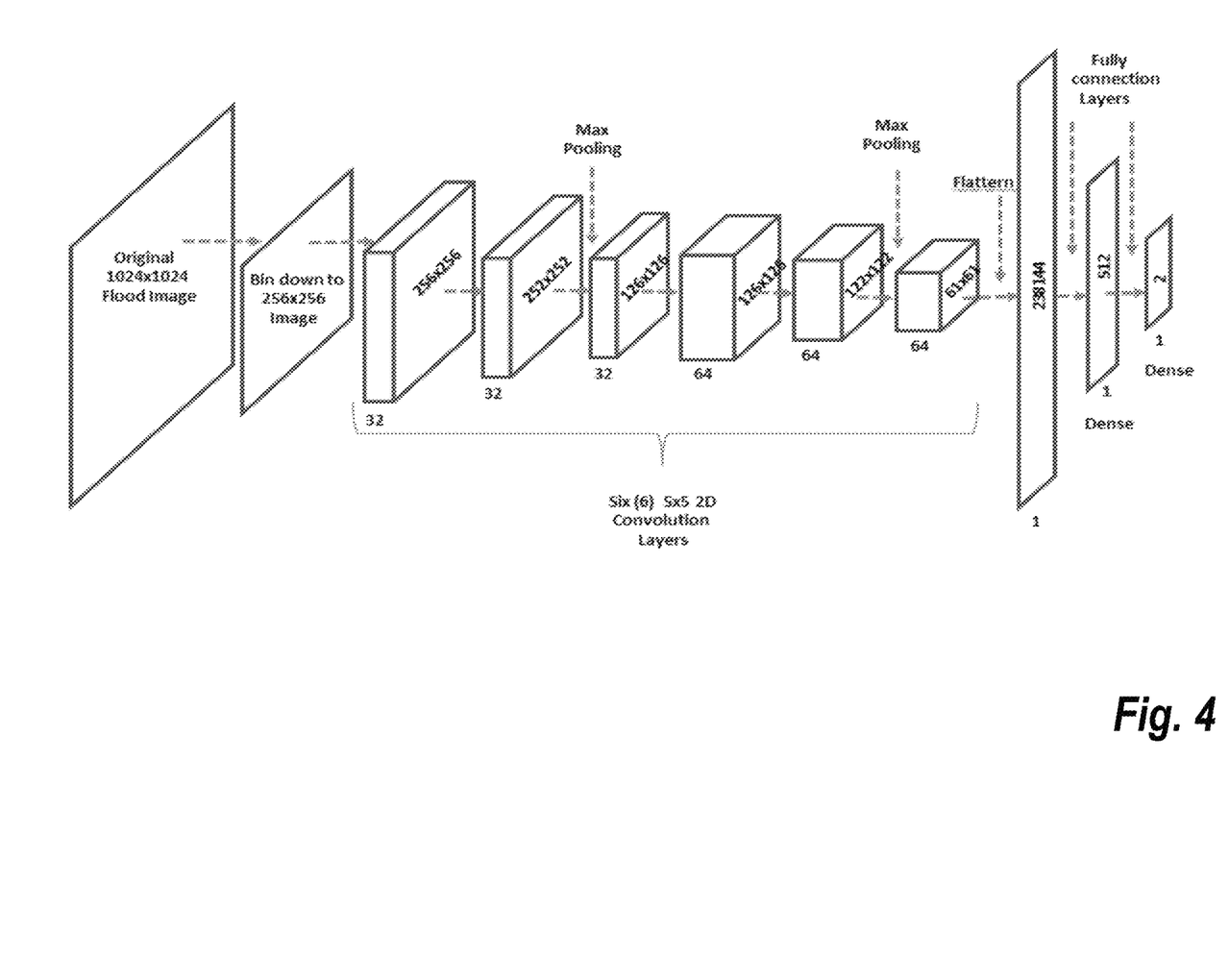
FIG. 4 shows an example CNN structure used in some embodiments.
Figure 5:
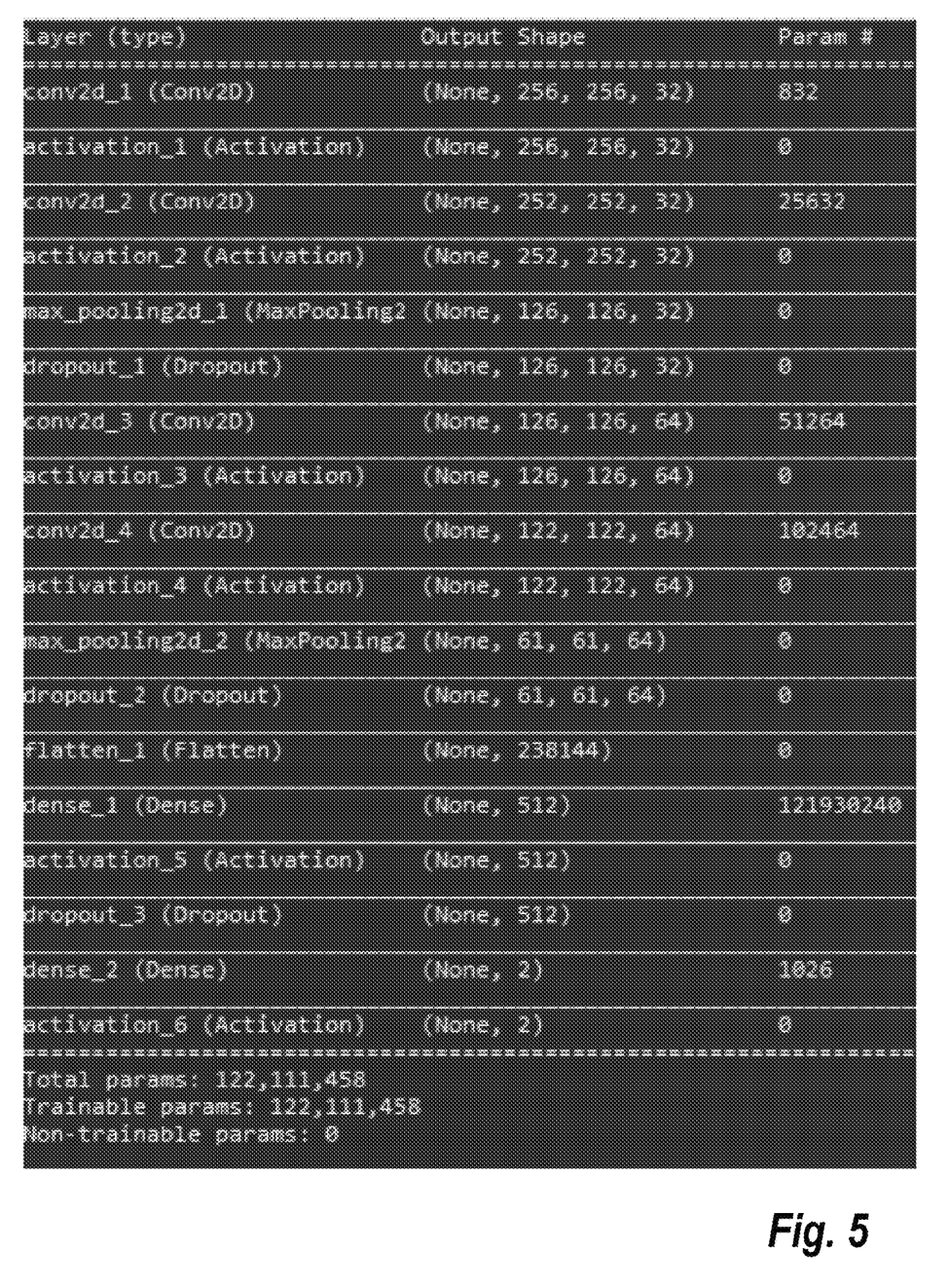
FIG. 5 shows example CNN shapes and parameters used in some embodiments.

A CNN 115 is trained based on the dataset generated by the Data Generator 110 and the Class Labels 150. FIG. 4 shows an example structure of the CNN 115, according to some embodiments. FIG. 5 shows the shapes and parameters associated with this example CNN. As shown in FIGS. 4 and 5, initially 1024×1024 flood images are resampled to 256× 256. The network takes the 256×256 images and applies 6 layers of convolution operations, all with 5×5 convolution kernel and rectified linear unit (ReLU) activation. Maximum pooling and dropout are used as well. The final layer is a two class softmax classifier that generates a probability for good flood and a probability for bad flood.

In some embodiments, data shuffling is used to train the CNN 115. As is generally understood in the art, data shuffling improves the quality and predictive performance of a machine learning model by varying training data set. Shuffling data effectively reduces the variance and ensures that models remain general and overfit less. In embodiments of the present invention, shuffling is applied at two separate points during the training pipeline. The first shuffle is done inside the Data Generator 110 for generating a set of random samples (this shuffle is realized by the bootstrap); the second shuffling is inside the CNN 115 training loop itself. Experiment indicates that this dual shuffling scheme indeed improves the classification accuracy.

Returning to FIG. 1, a backpropagation algorithm is used to determine the Weights 120 in the convolution filters of the CNN 115 that provide the correct classification to the Flood Images 105. Once the Weights 120 are determined, they are stored in a Data Repository 155 for later use. In FIG. 1, the details of the Multilayer Architecture 125 that defines the different layers of the CNN 115 are also output and stored in the Data Repository 155. Based on the Weights 120 and the Multilayer Architecture 125, the trained CNN 115 can be fully recreated for deployment.

FIG. 2 shows how a CNN 115 can be deployed, according to some embodiments. Here, the CNN 115 has been recreated based on the Weights 120 and the Multilayer Architecture 125 generated during training (see FIG. 1). The facility at which the deployment is made may be, for example, a medical facility where a SPECT Scanner 210 operates. Alternatively, it may be a remote computing facility connected to the SPECT Scanner 210. The SPECT Scanner 210 generates Flood Samples 205 that are sent to an Image Processing Computer 220. These Flood Samples 205 are used as input to the trained CNN 115 to generate one or more Probability Values 215 that provide the probability that each Flood Sample 205 belongs to a particular classification (e.g., good flood, bad flood, etc.). Once generated, the Probability Values 215 can be presented on a Display 225 for review by a user. In some embodiments, this Display 225 is part of the SPECT Scanner 210 that originally generated the Flood Samples 205.

Figure 6:
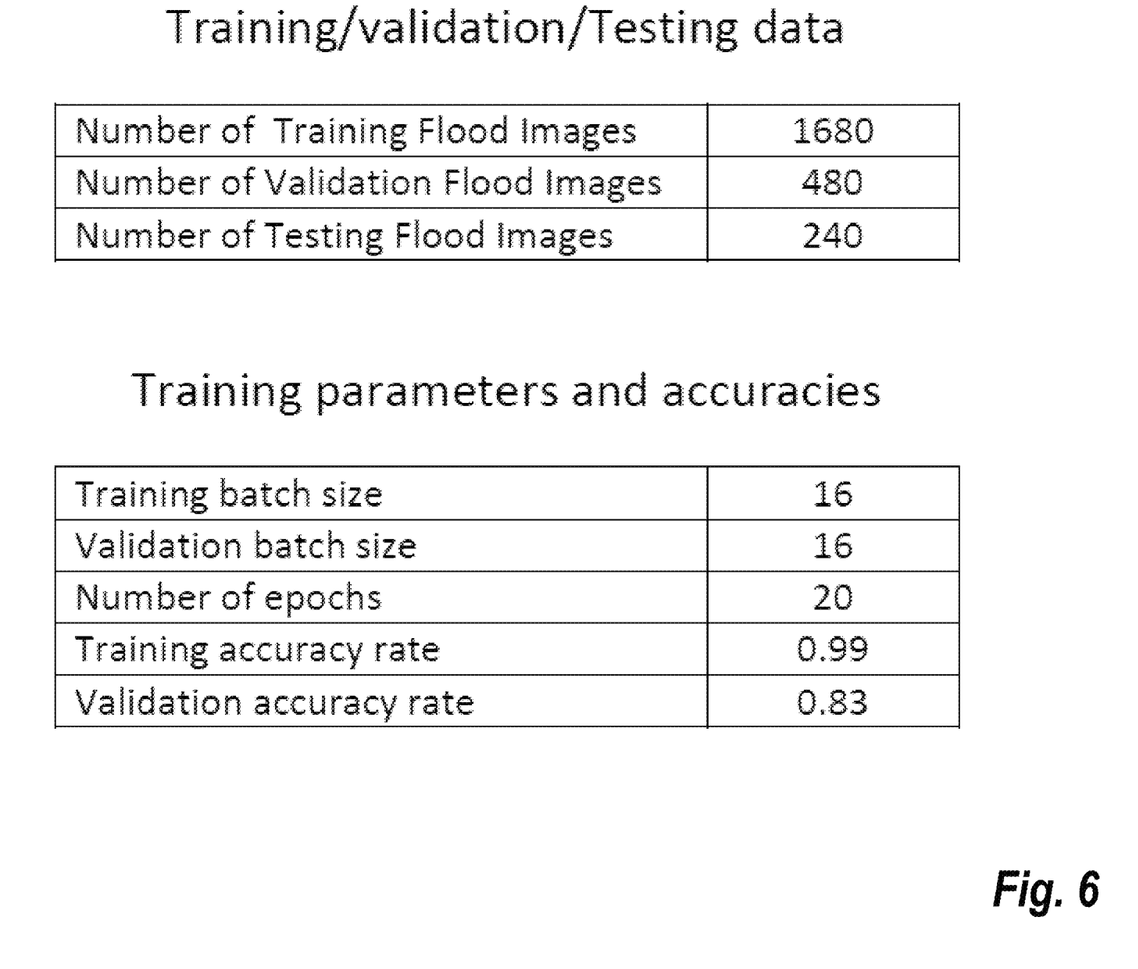
FIG. 6 shows an example training data set, and corresponding training parameters used for a proof of concept experiment described herein.

As a proof of concept, 60 SPECT intrinsic flood images were acquired; 30 of these images depicted good flood, and the other 30 depicted bad flood. All floods were acquired under 122 ev with ZLC turned on, and the total count of each flood image was approximately 30 million. For simplicity, the number of bootstrap k may be set to 1 which is equivalent to shuffling the data just 1 time. For each shuffled flood image, geometric flips (horizontal, vertical, diagonal) and Binomial subsampling was performed with 10 random realizations. This provided an additional 4×10 data augmented flood images for each original flood image. The resulting dataset was then randomly divided into three disjoint training, validation, and testing data sets. The CNN used the training and validation data sets during the training/validation stage as described in FIG. 6.

Figure 7:
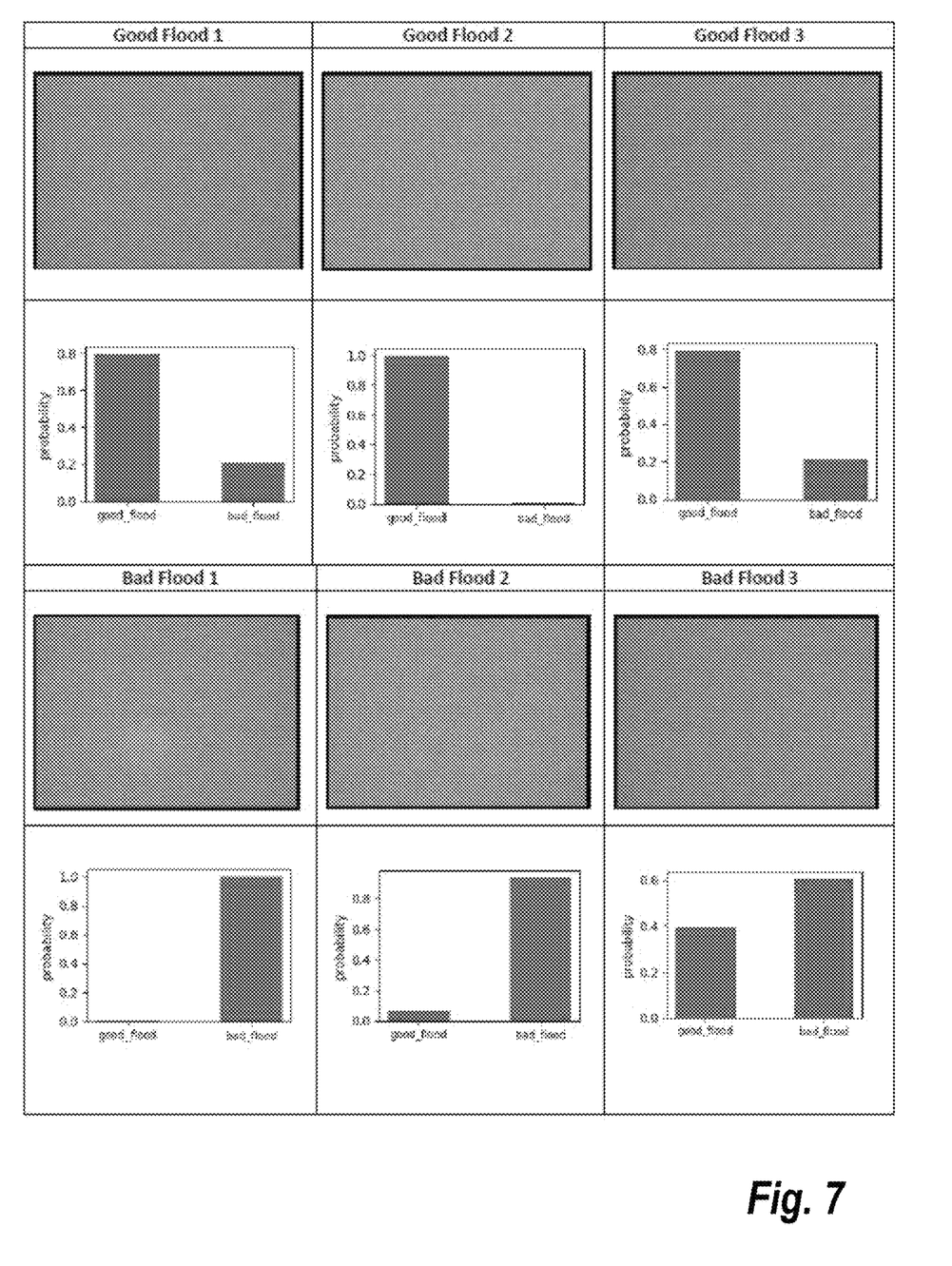
FIG. 7 shows example classification results for 3 good and 3 bad intrinsic floods.

The final deployment tests were done on 6 independent intrinsic floods with 3 good and 3 bad floods, respectively. All these six intrinsic floods were classified correctly as demonstrated in FIG. 7 below. Note that the subtle differences among good and bad flood images are not easy to be visualized by human eyes.

Figure 8:
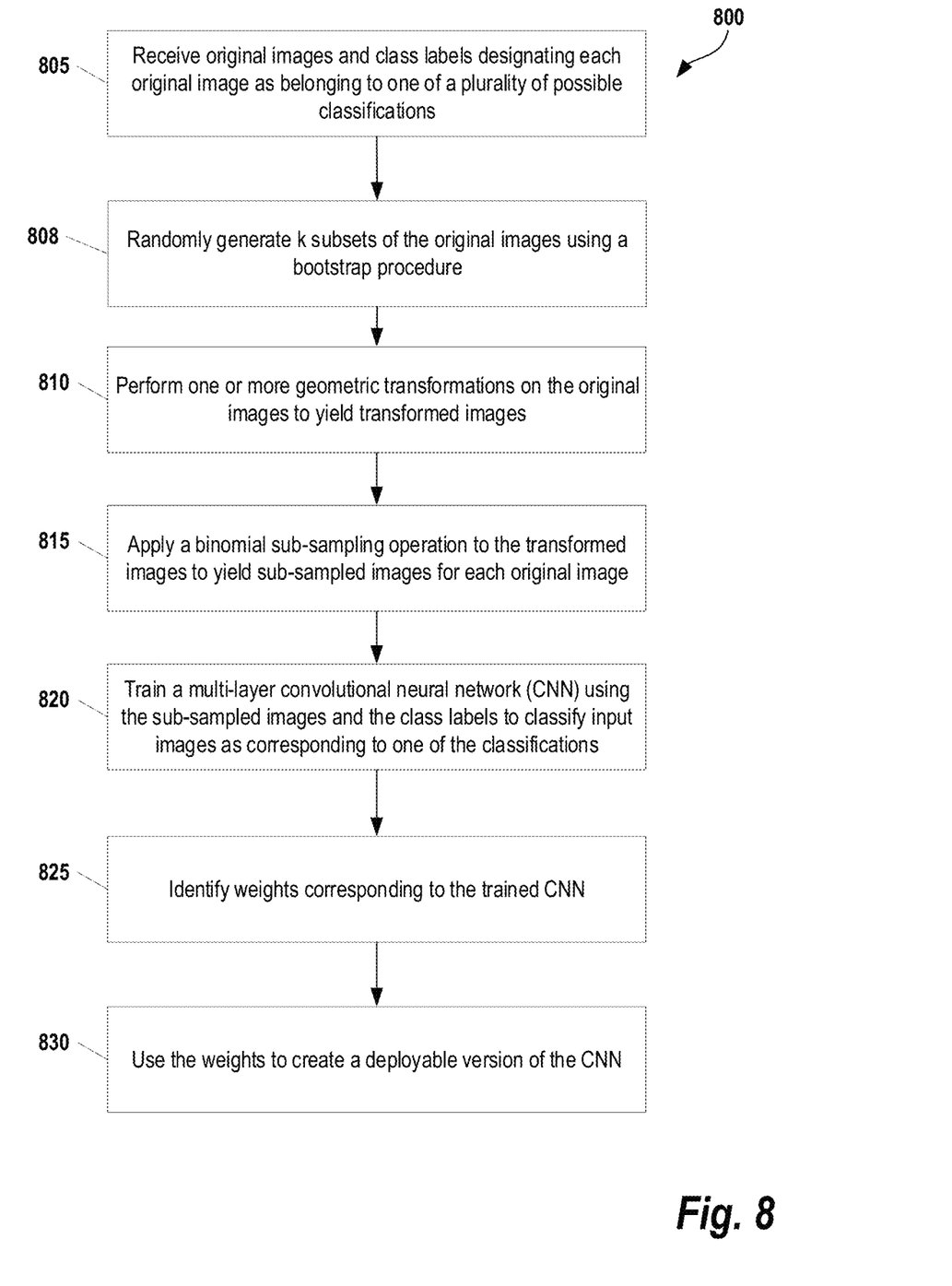
FIG. 8 shows a flowchart illustrating a computer-implemented method for automatically classifying emission tomographic images, according to the techniques described herein.

FIG. 8 shows a flowchart illustrating a computer-implemented method for automatically classifying SPECT images, according to the techniques described herein. Starting at step 805, a computing system (e.g., see FIG. 9) receives a plurality of original images and a plurality of class labels. Each class label designates an original image as belonging to one of a plurality of possible classifications. At step 808, the computing system randomly generates k subsets of the original images using bootstrap. This enlarges the data size from n to k*m, and also servers the purpose of the first data shuffling. Here n is the original data size, m is the size of each bootstrapped subset, k is the number of bootstraps. This bootstrap step not only enlarges the data sets but also makes the first data shuffling. At step 810, the computing system performs one or more geometric transformations on the original bootstrapped images to yield a plurality of transformed images. As noted above, these geometric transformations may include, for example, one or more of a horizontal transformation, a vertical transformation, and a diagonal transformation. The computing system applies a binomial sub-sampling operation to the transformed images at step 815 to yield a plurality of sub-sampled images for each original image. The sampling rate may be selected to provide a heterogeneous dataset while still preserving the overall distribution of counts present in the original image. Thus, for example, a relatively high sampling rate (e.g., 0.90 or higher) is used in some embodiments. In some embodiments, each of the sub-sampled images has an identical number of counts per image. In other embodiments, each of the sub-sampled images has a distinct number of counts per image.

Continuing with reference to FIG. 8, the computing system trains a multi-layer CNN at step 820 using the sub-sampled images and the class labels to classify input images as corresponding to one of the classifications received at step 805. At steps 825-830, the computing system identifies a plurality of weights corresponding to the trained CNN and uses those weights to create a deployable version of the CNN.

Figure 9:
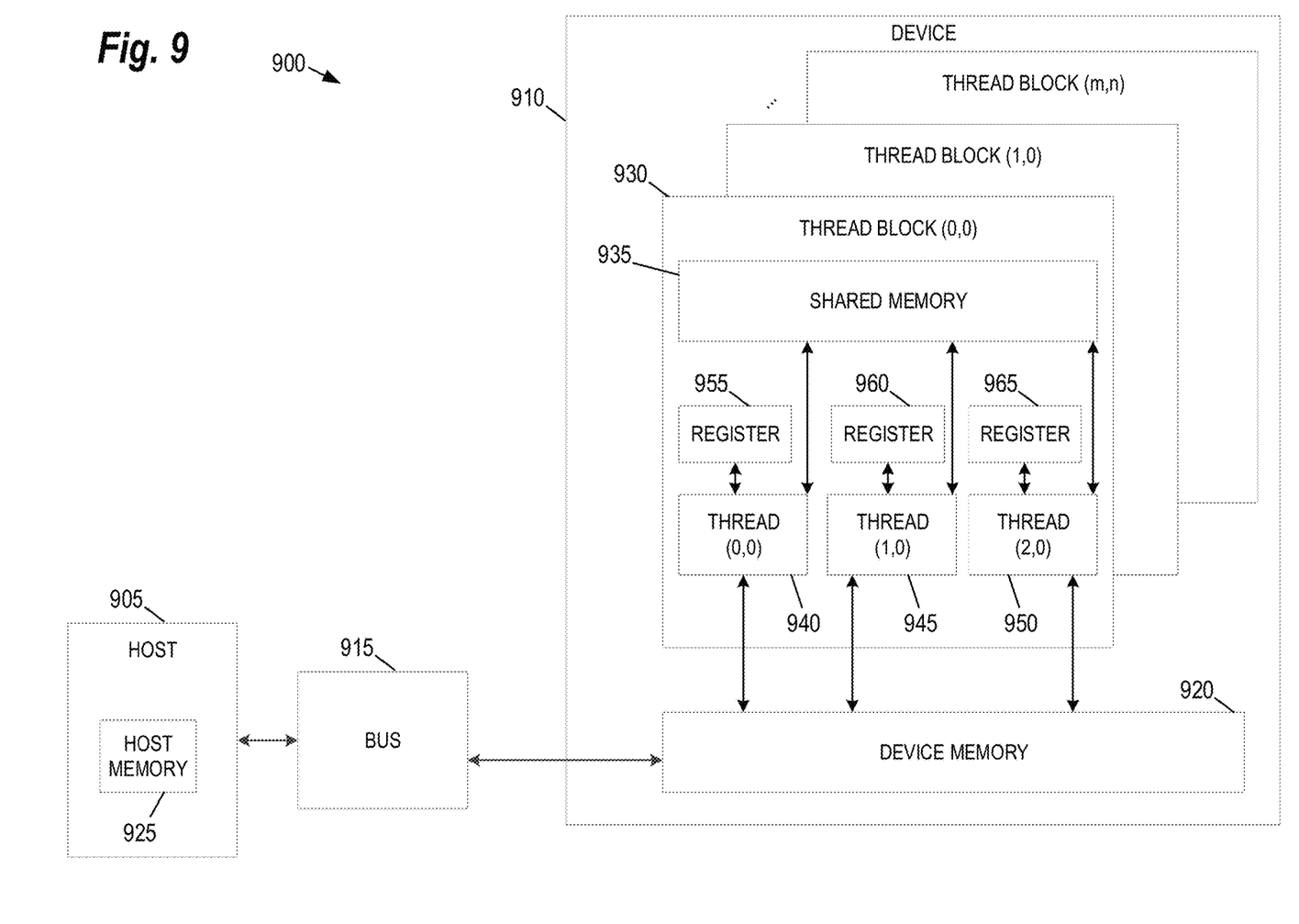
FIG. 9 illustrates an exemplary computing environment within which embodiments of the invention may be implemented

FIG. 9 provides an example of a parallel processing memory architecture 900 that may be utilized to implement the image processing computer illustrated in FIGS. 1 and 2 discussed above. This architecture 900 may be used in embodiments of the present invention where NVIDIA™ CUDA (or a similar parallel computing platform) is used. The architecture includes a host computing unit ("host") 905 and a GPU device ("device") 910 connected via a bus 915 (e.g., a PCIe bus). The host 905 includes the central processing unit, or "CPU" (not shown in FIG. 9) and host memory 925 accessible to the CPU. The device 910 includes the graphics processing unit (GPU) and its associated memory 920, referred to herein as device memory. The device memory 920 may include various types of memory, each optimized for different memory usages. For example, in some embodiments, the device memory includes global memory, constant memory, and texture memory.

Parallel portions of the training algorithms may be executed on the architecture 900 as "device kernels" or simply "kernels." A kernel comprises parameterized code configured to perform a particular function. The parallel computing platform is configured to execute these kernels in an optimal manner across the architecture 900 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the architecture 900 of FIG. 9 (or similar architectures) may be used to parallelize training tasks. For example, in some embodiments, processing of different image patches.

The device 910 includes one or more thread blocks 930 which represent the computation unit of the device 910. The term thread block refers to a group of threads that can cooperate via shared memory and synchronize their execution to coordinate memory accesses. For example, in FIG. 9, threads 940, 945 and 950 operate in thread block 930 and access shared memory 935. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 9, the thread blocks 930 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, processing of subsets of the training data or operations performed by the algorithms discussed herein may be partitioned over thread blocks automatically by the parallel computing platform software. However, in other embodiments, the individual thread blocks can be selected and configured to optimize rendering of images. For example, in one embodiment, each thread block is assigned a portion of the overall image.

Continuing with reference to FIG. 9, registers 955, 960, and 965 represent the fast memory available to thread block 930. Each register is only accessible by a single thread. Thus, for example, register 955 may only be accessed by thread 940. Conversely, shared memory is allocated per thread block, so all threads in the block have access to the same shared memory. Thus, shared memory 935 is designed to be accessed, in parallel, by each thread 940, 945, and 950 in thread block 930. Threads can access data in shared memory 935 loaded from device memory 920 by other threads within the same thread block (e.g., thread block 930). The device memory 920 is accessed by all blocks of the grid and may be implemented using, for example, Dynamic Random-Access Memory (DRAM).

Each thread can have one or more levels of memory access. For example, in the architecture 900 of FIG. 9, each thread may have three levels of memory access. First, each thread 940, 945, 950, can read and write to its corresponding registers 955, 960, and 965. Registers provide the fastest memory access to threads because there are no synchronization issues and the register is generally located close to a multiprocessor executing the thread. Second, each thread 940, 945, 950 in thread block 930, may read and write data to the shared memory 935 corresponding to that block 930. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 910 to read and/or write to the device memory. Device memory requires the longest time to access because access must be synchronized across the thread blocks operating on the device. Thus, in some embodiments, the processing of each image sample coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 9, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions a computing system's processor to generate signals representing the GUI display images. The processor, under control of an executable procedure or executable application, manipulates the GUI display images in response to signals received from the input devices. In this way, the user may interact with display images using the input devices, enabling user interaction with the processor or other device.

As used herein, the term "module" can refer to either or both of: (i) a software component that causes an electronic device to accept various inputs and generate certain outputs; or (ii) an electronic input/output interface, such as a panel, frame, textbox, window or other portion of a GUI.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

We claim:

1. A computer-implemented method for automatically classifying emission tomographic images obtained via a emission tomography scanner comprising a collimator that is used for imaging, the method comprising:
   receiving a plurality of original intrinsic flood images and a plurality of class labels designating each original intrinsic flood image with one of a plurality of classifications that describe any non-uniformities are present in the original intrinsic flood image;
   wherein the plurality of original intrinsic flood images were acquired without the collimator and without energy, spatial, or sensitivity correction for the scanner;
   utilizing a data generator to create a plurality of generated images based on the original intrinsic flood images, wherein (i) the data generator shuffles the original intrinsic flood images and (ii) the number of generated images is greater than the number of original images;
   performing one or more geometric transformations on the generated images to yield a plurality of transformed images;
   applying a binomial sub-sampling operation to the transformed images to yield a plurality of sub-sampled images for each original intrinsic flood image;
   training a multi-layer convolutional neural network (CNN) using the sub-sampled images and the class labels to classify input intrinsic flood images as corresponding to one of the plurality of classifications, wherein the sub-sampled images are shuffled again during a training loop of the CNN;
   identifying a plurality of weights corresponding to the trained CNN;
   and using the weights to create a deployable version of the CNN.

2. The method of claim 1, wherein the multi-layer CNN comprises six layers.

3. The method of claim 2, wherein a final layer of the CNN is a two class softmax classifier that generates a probability for each of the class labels.

4. The method of claim 1, wherein the class labels include a good flood label indicating an absence of non-uniformities in an image and a bad flood label indicating a presence of one or more non-uniformities.

5. The method of claim 1, wherein the class labels include:
   a good flood label indicating an absence of non-uniformities in an image, and
   a plurality of bad flood labels each describing non-uniformities in the image.

6. The method of claim 1, wherein the geometric transformations comprise one or more of a horizontal transformation, a vertical transformation, and a diagonal transformation.

7. The method of claim 1, wherein each of the sub-sampled images has an identical probability distribution as the original intrinsic flood images.

8. The method of claim 1, wherein each of the sub-sampled images has a distinct number of counts per image.

9. A system for computer-implemented method for automatically classifying emission tomographic images obtained via a emission tomography scanner comprising a collimator that is used for imaging, the system comprising:
   a memory unit storing a plurality of original intrinsic flood images and a plurality of class labels designating each original intrinsic flood image as belonging to one of a plurality of possible classifications, wherein the plurality of original intrinsic flood images were acquired without the collimator and without energy, spatial, or sensitivity correction for the scanner;
   an image processing computer configured to:
      randomly generate a plurality of subsets of the original intrinsic flood images using a data generator, thereby yielding a plurality of generated images;
      perform one or more geometric transformations on the generated images to yield a plurality of transformed images;
      apply a binomial sub-sampling operation to the transformed images to yield a plurality of sub-sampled images for each original image; and
      train a multi-layer convolutional neural network (CNN) using the sub-sampled images and the class labels to classify input intrinsic flood images as corresponding to one of the plurality of classifications, wherein the sub-sampled images are shuffled again during a training loop of the CNN.

10. The system of claim 9, wherein the image processing computer is implemented using a parallel processing memory architecture, and the CNN executes in parallel across a plurality of processing units.

* * * * *